United States Patent [19]
Gustin

[11] Patent Number: 5,560,462
[45] Date of Patent: Oct. 1, 1996

[54] MODULAR SPEED SENSOR FOR A ROTATING BODY

[75] Inventor: Ronald R. Gustin, Washington, Ill.

[73] Assignee: Caterpillar, Inc., Peoria, Ill.

[21] Appl. No.: 261,591

[22] Filed: Jun. 17, 1994

[51] Int. Cl.$^6$ .......................... F16D 35/00; F16D 25/062; G01P 3/487
[52] U.S. Cl. ...................... 192/58.42; 192/30 W; 192/103 F; 324/207.2
[58] Field of Search .............................. 192/30 W, 103 F, 192/85 AA, 103 R, 58 C, 58.42; 324/207.2; 174/65 G, 65 SS

[56] References Cited

U.S. PATENT DOCUMENTS

| | | | |
|---|---|---|---|
| 4,506,590 | 3/1985 | Miki et al. | 192/30 W X |
| 4,525,000 | 6/1985 | Bachle | 174/65 SS X |
| 4,874,072 | 10/1989 | Mohan et al. | 192/103 F X |
| 4,899,861 | 2/1990 | Cummings, III . | |
| 4,934,501 | 6/1990 | Gay et al. | 192/30 W X |
| 4,992,734 | 2/1991 | Adachi | 324/207.2 X |
| 4,994,739 | 2/1991 | Honda et al. | 324/207.2 X |
| 5,070,298 | 12/1991 | Honda et al. | 324/207.2 |
| 5,121,289 | 6/1992 | Gagliardi | 324/207.2 X |
| 5,299,451 | 4/1994 | Brosse | 324/207.2 X |
| 5,394,081 | 2/1995 | Ogawa et al. | 324/207.2 X |

FOREIGN PATENT DOCUMENTS

| | | | |
|---|---|---|---|
| 4103947 | 8/1992 | Germany | 324/207.2 |

OTHER PUBLICATIONS

AIRPAX Speed Sensors Tachometry Meters.
MICRO SWITCH, "Digital Hall Effect Position/Motion Sensing of Off Road Equipment Components", Thomas J. Gastel, International Off–Highway & Powerplant Congress & Exposition, Milwaukee, WI, Sept. 12–15, 1988.
MICRO SWITCH Solid State Sensors, Catalog 20, Sept. 1993.
SAE Paper No. 911780, "Gerotor Motors Incorporating Speed Sensing", James M. Dowling, International Off–Highway & Powerplant Congress & Exposition, Milwaukee, WI, Sep. 9–12, 1991.

*Primary Examiner*—Rodney H. Bonck
*Attorney, Agent, or Firm*—R. Carl Wilbur

[57] ABSTRACT

A modular speed sensor for sensing the speed of a rotating body is disclosed. The sensor includes a sensor housing comprising an elongate tube and a sensor housing body. A hall effect sensor is installed in the elongate tube and wires connected to the hall effect sensor extend through the tube and connect to a wire interconnect board installed within the sensor housing body. A compression grommet is provided to hold the wire interconnect board within the sensor housing body. Preferably, a second set of wires extend through holes in the compression grommet and connect to the wire interconnect board. The second set of wires can then be connected to a control circuit or other device to read a speed signal from the modular speed sensor.

8 Claims, 3 Drawing Sheets

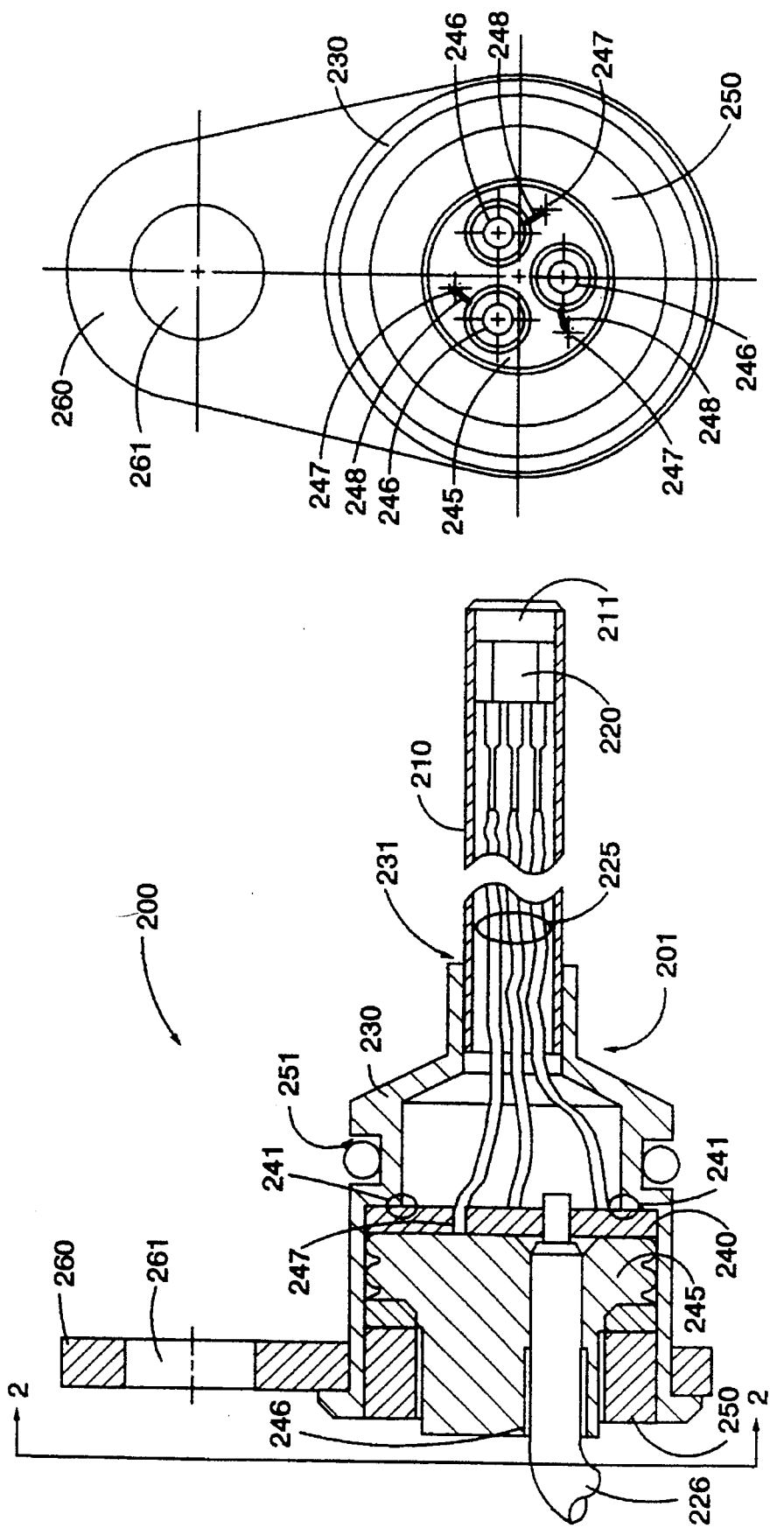

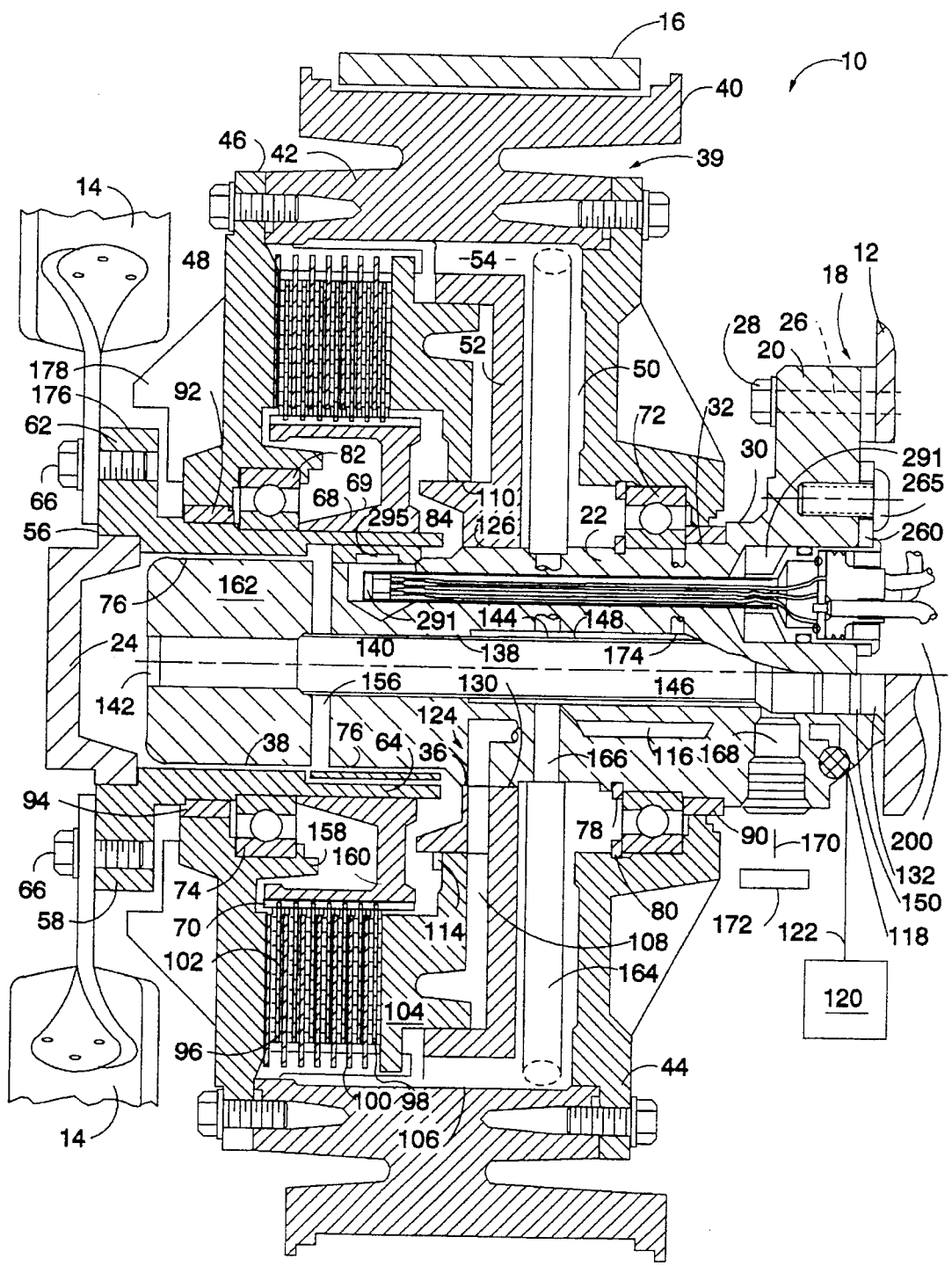
Fig_4_

MODULAR SPEED SENSOR FOR A ROTATING BODY

FIELD OF THE INVENTION

The present invention relates generally to a speed sensor for sensing the rotational speed of a moving body, and more particularly to a modular speed sensor that can be replaceably installed in a shaft or other object.

BACKGROUND OF THE INVENTION

In many control applications, it is often necessary to sense the speed of a rotating body. Some applications require installation of a speed sensor in harsh environments in which the sensor might be exposed to debris or other material that could damage the sensor or prevent it from operating. For example, it might be desirable in some applications to sense the speed of an engine cooling fan or other moving device on an internal combustion engine. One method of sensing the cooling fan speed might use a sensor that is mounted adjacent to the fan blades to sense the number of fan blades that pass the sensor over a given time period. The signal generated by the sensor could then be used to calculate fan speed. However, such a sensor would be exposed to the engine compartment environment and would be exposed to dirt or other debris generated by fan air flow that could interfere with the sensor operation or damage the sensor.

An engine cooling fan speed sensor would be particularly useful for engine controls or for cooling controls that optimize engine performance and environmental emissions, or otherwise require an engine cooling fan speed feedback signal. Variable speed drives for engine cooling fans are known in the art. One such system is disclosed in U.S. Pat. No. 4,899,861, which permits a control system to control engine cooling fan speed over a range of speeds. Using a fan speed sensor in connection with such a drive would enable the control to receive a fan speed feedback signal to more precisely control engine cooling fan speed.

Some of the same problems associated with using a speed sensor to sense fan speed on an internal combustion engine are present when applying a speed sensor to other severe environments. For example, on a track laying work vehicle such as a track-type tractor, it might be desirable to sense the rotational speed of a drive sprocket or an idler sprocket. It would theoretically be possible to place a sensor adjacent to the sprocket to sense the number of teeth passing the sensor. However, the sensor would be exposed to rocks and other debris that could interfere with the performance of the sensor or damage the sensor. It would therefore be preferable to have a sensor that can sense the rotational speed of a rotating body, but at the same time, be protected from the operating environment of the rotating body.

In still other applications, it is sometimes necessary to mount a speed sensor at one location on an object and have the wires connected to the sensor come out of the object at a second, remote location. In these applications, it is often necessary to route electrical conductors through the object. This often entails first drilling or otherwise machining a hole through the object. Then, the speed sensor is installed and the wiring routed through the machined hole. It is difficult and labor intensive to manually route the wires through the hole. Moreover, the wires are also susceptible to damage as they are threaded through the hole. It would be desirable to have a speed sensor that could reliably sense the speed of a rotating body at some distance from the location where the electrical conductors emerge from the object.

Some manufacturers have recognized these problems and attempted to overcome them by installing a speed sensor in the shaft around which the rotating body turns. Since the sensor is installed within the shaft, it is not exposed to the environment of the rotating body. Those manufacturers have generally permanently installed a hall effect sensor in a hole drilled in the shaft. Wires are connected to the hall effect sensor. The wires extend through the hole, out an end of the shaft and are connected to an electronic control. The hall effect sensor and the wiring are permanently installed within the shaft using an epoxy or other similar substance. A magnet is placed on the rotating body, in a location that passes adjacent to the hall effect sensor when the body rotates about the shaft. As the magnet passes adjacent to the hall sensor, the hall sensor develops a signal. While this design works in some instances, the wires connected to the hall effect sensor, and the hall effect sensor itself, are susceptible to damage during installation. During installation the wire can be easily crimped, cut or otherwise damaged as they are manually threaded through the hole. This is especially true since the wires may be exposed to corners or other edges of the freshly machined metal. The exposed wire could then be grounded to the shaft, which would prevent the sensor from operating correctly. Since it is difficult to test the sensor without fully assembling the shaft and rotating body combination, the assembler would not be able to determine that the sensor had malfunctioned until after the sensor has been permanently installed in the shaft. At that point, if the sensor or wiring has failed, the whole shaft and rotating body must be remanufactured. The reliability and serviceability of such sensor systems are generally unsatisfactory.

An engine fan speed sensor of the form previously described has been developed by Rockford Powertrain, located in Rockford, Ill. That fan speed sensor includes a hall sensor that is an integral part of a shaft in the fan clutch. The hall sensor, circuitry and wiring are permanently fixed within the shaft during the manufacturing process. That process includes machining a channel in the shaft, threading connection wires through the channel, connecting the wires to the hall sensor, and permanently fixing the hall sensor and wiring within the channel using an epoxy or other similar substance. The process is labor intensive and difficult to accomplish without damaging the wiring or sensor. Furthermore, once the sensor and wires are permanently installed in the shaft, assembly of the fan clutch is more complicated and the sensor and wires are exposed to damage, which would then render the shaft useless. Because of the difficult, labor intensive assembly process, there are problems with the speed sensor's reliability. And, because the speed sensor is an integral part of the fan clutch shaft, the sensor cannot be individually replaced once it is found to be faulty or to have failed. Thus, the entire fan clutch must be removed from the engine and remanufactured making the serviceability of the sensor very low. For these and other reasons, it would be desirable to have a reliable, serviceable fan clutch speed sensor. It would also be preferable to have a replaceable modular speed sensor that overcomes the drawbacks and disadvantages associated with prior art speed sensor systems.

SUMMARY OF THE INVENTION

In light of the foregoing drawbacks and disadvantages of prior art speed sensors, it is an object of a preferred embodiment of the present invention to provide a modular speed sensor that can be installed in a shaft or other object and is thereby shielded from the external operating environment of the shaft.

Another object of an embodiment of the invention is to provide a speed sensor that reduces the risk of damage to the sensor during installation.

Yet another object of an embodiment of the present invention is to provide a modular speed sensor that is installable in a shaft or other object and can be individually replaced without having to remanufacture the shaft or object.

Accordingly, a preferred embodiment of the present invention includes a sensor housing comprising a sensor housing body and an elongate tube. A hall effect sensor is installed in a first end of the elongate tubing and a plug is installed in the first end of the tubing. A second end of the tubing is inserted into the sensor housing body. Electrical connectors are connected to the hall effect sensor and to a wire interconnect board. Preferably, a second set of electrical connectors are connected to the wire interconnect board and extend from the sensor housing body.

Still other objects and advantages of the present invention will become apparent upon reading the detailed disclosure of a preferred embodiment in connection with the drawings and appended claims.

BRIEF DESCRIPTION OF THE DRAWINGS

FIG. 1 is a sectional view of a preferred embodiment of the modular speed sensor of the present invention;

FIG. 2 is an end view of a preferred embodiment of the modular speed sensor of FIG. 1, taken along the line 1—1;

FIG. 4 is a sectional view of an embodiment of the variable speed drive assembly and modular speed sensor used in the present invention.

DETAILED DESCRIPTION OF THE PREFERRED EMBODIMENTS

Figure 3:
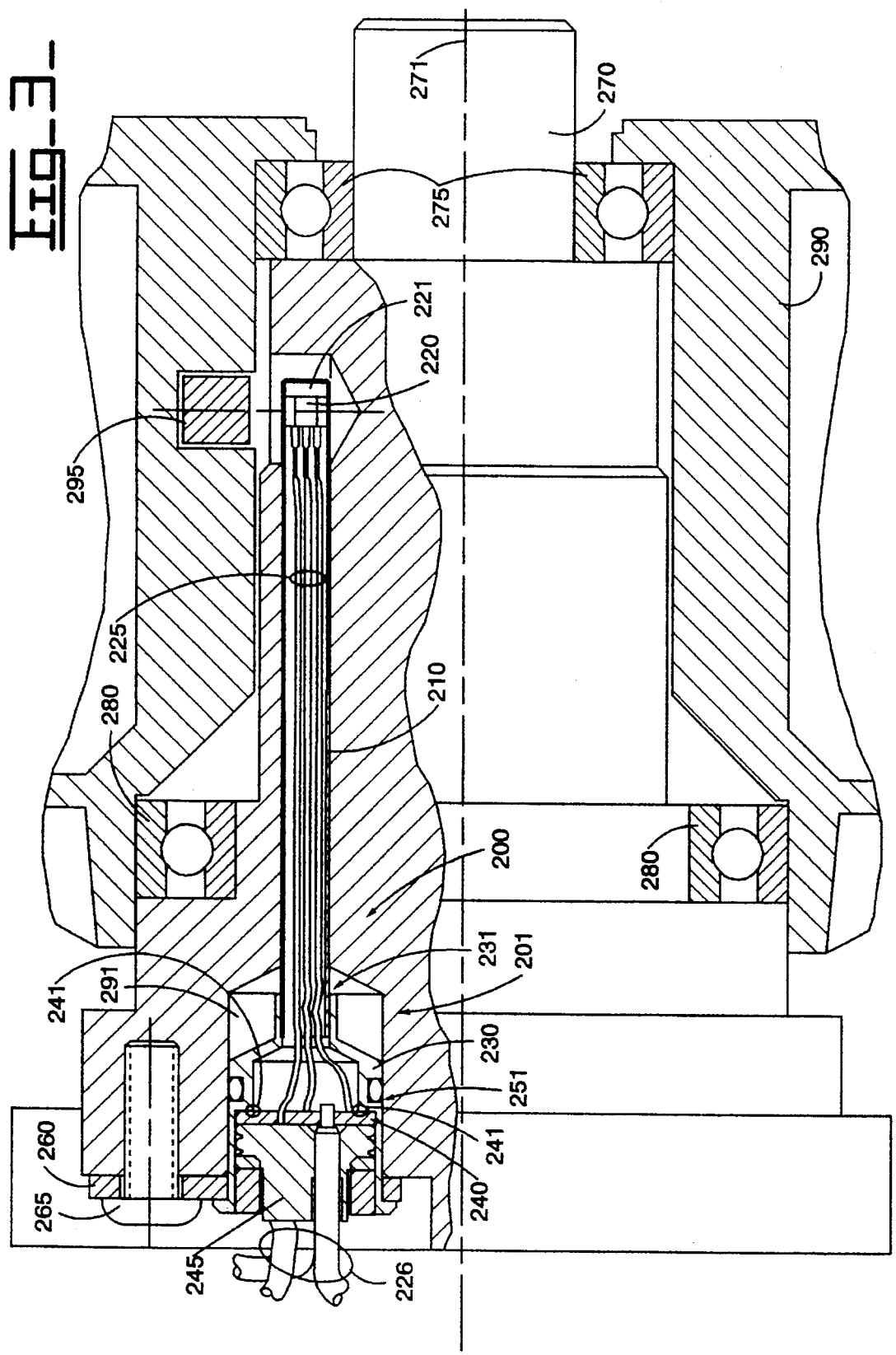
FIG. 3 is a sectional view of a preferred embodiment of a modular speed sensor installed in a shaft.

This detailed description of the preferred embodiment completely and fully describes the best mode of the preferred embodiment. The present invention is not limited to this single embodiment. On the contrary, the present invention encompasses all other embodiments and equivalents as may fall within the scope of the invention as defined by the appended claims.

Referring to the drawings, like reference numbers refer to like parts throughout the several views. Referring first to FIG. 1, a sectional view of a preferred embodiment of the modular speed sensor 200 of the present invention is shown. The modular speed sensor 200 includes a hall effect sensor 220 installed within a sensor housing 201. Preferably, the sensor housing 201 includes an elongated tube 210 connected to a sensor housing body 230, although in some cases, particularly where the length of the elongated tube is short, it might be desirable to make the sensor housing 201 as a single piece. The elongated tube 210 may be of any length necessary. The length of the elongated tube 210 is determined by the particular sensor application, and more specifically by the distance that the hall effect sensor 220 must be inserted into the shaft or other object. The sensor housing 201 is preferably constructed from a non-magnetic grade of stainless steel. However, it should be recognized that the sensor housing 201 could be readily and easily made from any non-magnetic material.

The hall effect sensor 220 is inserted and fixed within a first end of the elongated tubing 210. A plug 211 is installed in the first end of the elongated tube 210 and is preferably braze welded in place. A second end of the elongated tube 210 is preferably inserted into a first opening 231 of the sensor housing body 230 and braze welded to hold it securely in place. Although braze welding is preferred for securing the plug 211 to the elongated tubing 210 and the elongated tubing 210 to the sensor housing body 230, there are other methods of making these connections that can readily and easily be employed without deviating from the spirit and scope of the present invention as defined by the appended claims.

Electrical connectors 225 are connected to the hall effect sensor 220. The electrical connectors 225 preferably extend through the tubing 210 and are electrically connected to a wire interconnect board 240. The wire interconnect board is installed within the sensor housing body 230 and is held in place against an interconnect board seat 241 by a compression grommet 245. A compression ring 250 is installed around a circumference of the compression grommet 245 and holds the compression grommet 245 in place.

As shown in FIG. 2, the interconnect board 240 preferably includes a printed circuit board having electrical runs 248 that electrically connect pairs of the electrical connectors 225 and a second set of electrical connectors 226. The second set of electrical connectors 226 are then connected to control circuitry (not shown).

As shown in FIG. 2, the compression grommet 245 includes several holes 246 to accommodate the second set of electrical conductors 226. Also shown, there are electrical connection points 247 for the first set of electrical connectors 225. As noted above, the wire interconnect board 240 includes electrical runs 248 that electrically connect the first set of electrical connectors 225 to the second set of electrical connectors 226. Although in a preferred embodiment a wire interconnect board does not include other electronic circuitry or components, it is conceivable that the sensor housing body could be enlarged to accommodate a larger interconnect board that could accommodate signal conditioning or other circuitry. Also, although a preferred embodiment of the modular speed sensor includes the second set of electrical connectors 226 having three wires, another number of wires could be used depending on the actual number of connections that need to be made. Also, in some instances, the wire interconnect board 240 may be unnecessary and the electrical connectors 225 may extend through the holes 246 in the compression grommet 245

In a preferred embodiment, the first set of electrical connectors 225 are of a smaller diameter than the second set of wires 226. The smaller diameter wires permit the sensor housing 201 to be constructed using a smaller diameter elongated tube 210, which in turn permits the hall effect sensor 220 to be positioned more closely to the magnet 295. The smaller diameter wires, however, are less resilient and could potentially be damaged if exposed to the engine environment or during assembly. Thus, a preferred embodiment includes a second set of electrical connectors 226 that are preferably a heavier gauge wire, making them less susceptible to damage.

Referring again to FIG. 1, the sensor housing body 230 includes a channel 251 in which an O-ring 235 is inserted. The O-ring 235 acts as a seal to prevent oil or other substances from leaking from one side of the O-ring 235 to the other side. A tab 260 is connected to a circumference of the housing. Included in the tab 260 is a bored hole 261 for accepting a bolt or other suitable fastening device by which the modular speed sensor 200 can be attached to another body. Because the hall effect sensor 220 is installed in the first end of the elongated tubing 210 and, as is known in the art, the orientation of the hall effect sensor 220 may affect the quality of the signal output, it is important to place the sensor 200 in a desired orientation. The tab 260 also helps insure that the modular speed sensor 200 will be installed in a shaft or other body in a particular, desired orientation.

Referring now to FIG. 3, a sectional view of an embodiment of the modular speed sensor 200 as shown in FIGS. 1 and 2 is shown installed in a shaft 270. Two bearings 275,280 are mounted on the shaft 270. The inner race of each bearing 275,280 is in contact with the shaft. The outer race of each bearing 275,280 is in contact with a rotating body 290. As is known in the art, the bearings rotatably support the rotating body 290. A magnet 295 is installed in the rotating body, in a location such that as the body rotates about an axis 271 of the shaft 270, the magnet 295 will pass adjacent to the hall effect sensor 220. Although a preferred embodiment includes a single magnet 295, in some applications it may be desirable to install more than one magnet. This may be particularly true in applications where the body is rotating slowly. The hall effect sensor then produces an electrical signal on the first set of electrical connectors 225. The signal travels through the first set of electrical connectors 225, the electrical runs 248 of the interconnect board 240, and the second set of electrical connectors 226 to the control circuitry (not shown).

Although a preferred embodiment has been described with respect to a stationary shaft 270 and a rotating body 290, it should be recognized that the body could be stationary and the shaft could rotate. In that case, one skilled in the art could readily and easily install the modular speed sensor 200 in the stationary body and mount the magnet 295 or magnets on the rotating shaft.

As shown in FIG. 3, a bolt 265 or other suitable fastener is inserted through the hole 261 of the tab 260. A hole 291 is bored in the shaft 270 such that the modular speed sensor 200 can be inserted within the bored hole 291. The bored hole 291 may include varying diameters. The bolt 265 holds the modular speed sensor 200 in place within the bored hole 291.

As can be appreciated from the figures and the foregoing description, a preferred embodiment of the present invention solves many of the problems associated with prior art speed sensors. The present modular speed sensor 200 is a modular design that permits the speed sensor to be individually replaced without having to disassemble the shaft/rotating body combination and remanufacture the shaft. Moreover, because the modular speed sensor 200 is self contained, there is a much lower risk of damaging the wires that connect the hall effect sensor to the control circuitry when installing the speed sensor. Even if the wires are damaged, the speed sensor can be individually replaced, without having to replace the entire shaft. An embodiment of the modular speed sensor 200 of the present invention also permits the hall effect sensor 220 to be located in a remote location, internal to a shaft or object and in a position that could not be reached with a traditional sensor. Because the length of the elongated tube 210 can be lengthened or shortened for different applications the hall sensor can be placed at different positions within the object, helps protect the wiring from damage, and insures that the overall sensor can be easily replaced.

One particularly useful application for an embodiment of the present invention is in connection with a variable speed fan clutch such as the one disclosed in U.S. Pat. No. 4,899,861, entitled "Variable Speed Drive for Engine Cooling Fans" and assigned to Rockford Powertrain, Inc, of Rockford, Ill.

Referring to FIG. 4, an embodiment of the modular speed sensor 200 is shown installed in a variable speed fan drive 10 mounted on a prime mover or internal combustion engine 12. Fan blades 14 are connected to the drive for circulating a current of air about,portions of an engine cooling system (not shown). The drive 10 is powered from the prime mover by a force transfer means in the form of an endless belt 16.

The structure of the variable speed drive unit 10 will now be described. A non-rotatable, stationary member 18 having a bracket arm 20 and a cantilevered or extended arm 22 with a longitudinal axis 24 serves as a means for mounting the drive 10 to the power source. The bracket arm 20 includes apertures or slots 26 through which mounting screws 28 extend for securing the member 18 to the engine. The cantilevered arm 22 is provided with progressively smaller diameter portion or sections 30, 32, 34, 36 and 38.

Mounted for rotation on arm portion 22 and about axis 24 is an input drive member 39. The drive member 39 includes a housing assemblage 40 comprised of an outer portion 42, with apertured radial side portions 44 and 46, respectively. The force transfer means 16 is entrained about the assemblage 40 in a manner imparting rotary motion to the input member 39. The housing 40 of the input member defines a clutch chamber 48, a fluid return chamber 50, and an axially oriented cylinder portion or piston chamber 52. Moreover, one or more fluid passageways 54 disposed radially outward from said cylinder portion 52 permit communication between the clutch chamber 48 and the fluid return chamber 50.

Coaxially mounted for rotation on arm 22 and about said axis 24 is an output member or fan hub assembly 56. In a preferred embodiment of the variable speed fan drive, the fan hub assembly 56 includes a fan hub 58 and a member 60 arranged in driving association with the fan hub 58. The fan hub 58 includes a flange portion 62 at its outer end and a sleeve portion 64 which is telescopically arranged about reduced section 38 of the cantilevered arm 22 and extends toward an inner end of the hub assembly 56. The fan blades 14 may be releasably secured to the flange portion 62 by any suitable fastening means, i.e. bolt 66. For assembly and manufacturing purposes, at its inner end and extending for a portion of its length, the sleeve portion 64 is provided with external elongated splines 68 which cooperate with spline portion 69 on member 60 in a nonrotative, axially slidable relationship. The member 60 radially extends from the sleeve portion 64 and into the clutch chamber 48 of the drive housing 40. At its radial outermost edges, the member 60 includes another spline portion 70 for connection to portions of a friction clutch assembly.

Axially spaced bearing means are provided for rotatably mounting the input drive member 39 and the fan hub assembly 56 on the cantilevered arm 22. Such bearing means may include three bearing sets 72, 74 and 76. The first bearing set 72 is disposed intermediate the reduced diameter section 34 on arm 22 and the interior of the input drive member housing 40. The first bearing set is axially secured relative the arm 22 and housing 40 by means of retainer rings 78 and 80. The second bearing set 74 is disposed intermediate the sleeve portion 64 of the hub assembly 56 and the interior of the drive member 40. Retainer rings 82 and 84 serve to axially secure the second bearing set relative the hub assembly and housing. The third bearing set 76 includes axially spaced sets of needle bearings or bushings arranged about the reduced section 38 of arm 22 and the interior of sleeve portion 64. In the preferred embodiment, the first and second bearings sets 72 add 74 are anti-friction or ball bearings. By such construction, the input drive member 39 and fan hub assembly 56 are permitted to rotate relative to the mounting arm 18 and to each other.

As will be subsequently described, fluid is delivered to the interior of the drive unit 10. The housing 40 of the input member 39 combines with the fan hub assembly 56 and the cantilevered arm 22 to define a fluidically sealed enclosure. To effect that end, appropriate annular sealant means 90 and 92 are provided in combination with housing 40, at the inner and outer ends of the unit 10, to retard or prevent leakage or fluid therefrom. Conventional excluders 94 are mounted adjacent the seals 90 and 92 to protect same from environmental contaminants.

A modulatable friction clutch assembly 96 provides a slippable frictional coupling between input drive member assembly 38 and output member 56. The clutch assembly includes a pack of interleaved friction discs or elements 98, 100 which are disposed in the clutch chamber 48 of housing 40 between an annular abutment 102 defined on housing 40 and an annular piston 104. Friction discs 98 are connected to splined portion 70 of member 60, and alternate discs 100 are connected to elongated splines 106 provided on input drive member 39. One group of the discs 98 or 100 is provided with a wet type friction facing material which is selected in combination with a lubricating fluid to provide a predetermined coefficient of friction between the discs 98,100. When sufficient pressure is applied to the plates or discs, motion is transmitted between drive member assembly 39 and driven member 56. The amount or level of pressure applied to the clutch assembly controls the torque transfer between the driving and driven members and, thereby, the speed of the fan blades 14.

In a preferred embodiment of the variable speed drive unit 10, the annular piston 104 applies an axially compressive force against one end of the clutch pack 96. The annular piston 104 rotates with the input member 39 and is mounted for axial displacement in the piston chamber 52 provided in the housing 40. By such construction, all clutch clamping forces are confined to the housing. As such, substantially no axial thrust load is applied to the axially spaced bearing means during operation of unit 10. The piston 104 cooperates with the cylinder portion 52 to define an expandable chamber 108. To effect this end, the piston 104 is appropriately sealed to retain hydraulic pressure rearward thereof in the chamber 108 as by means of a pair of conventional annular oil seals 110. The piston 104 also serves to separate clutch chamber 48 from the expandable chamber 108 formed in the housing 40. One or more annular, dished resilient members or springs 112 are captured between the piston 104 and a retainer ring 114 which is fixedly associated with the housing 40 of drive member 39. As such, the piston is normally urged to the right, as seen in FIG. 4, into a nonengaging clutch position.

Unlike other drive assemblies which may utilize the combination of air and hydraulic fluid for operating the assembly, the present invention relies on one fluid for actuation. A plurality of fluid passageways are included with the drive assembly of the present invention. A first fluid inlet means provides operating fluid to the expansible chamber 108 from outside the housing 40. A second fluid inlet means supplies lubricating fluid from outside of housing 40 to the clutch assembly 96 and bearing means. A third fluid passageway furthermore provides a fluid outlet or return for the drive assembly 10.

The first fluid inlet means is defined by a control passage 116 provided in the stationary arm 22. The valve assembly 120 may be of the type disclosed in U.S. Pat. No. 3,804,219 granted Apr. 16, 1974, the full disclosure of which is incorporated herein by reference. Alternatively, the valve arrangement disclosed in U.S. Pat. No. 4,555,910 granted to F. Sturges on Dec. 3, 1985, could be used in combination with the instant invention. Suffice it to say, the valve assembly 120 supplies a regulated or controlled fluid pressure to the control passageway 116 as a function of engine operating temperature. The valve assembly 120 could be alternatively designed to control or regulate fluid pressure as a function of some other engine parameter or other criteria defined by the user. The other end of the control passage 116 opens to a rotating joint 124 sealed on opposite sides by annular piston rings 126. The rotating joint 24 is defined by an annular passage 128 provided on reduced diameter section 36 of arm 22 and a radially extending bore 130 provided in housing 40. The annular passage 128 communicates with the expansible chamber 108 through the radially extending bore 130 so as to provide pressure from the valve assembly 120 thereto. As may be readily appreciated, the amount or level of fluid pressure directed to the expandable chamber controls the axial compressive force applied by piston 104 to the clutch assembly and, therefore, the output speed of the fan.

A stepped axial bore 132 having reduced adjacent sections 134, 136, 138, 140 and 142 may also be provided in the cantilevered arm 22. A hollow tube assembly 144 is axially fixed within the bore 132. The inner end of the tube assembly is supported in bore section 134 while its other end is supported by bore section 138. The bore section 136 intermediate the supported ends of the tube assembly 144 is larger than the diameter of the midsection of the tube assembly. By such construction, two fluid passageways 146, 148, one inside and one outside of the tube assembly 144 are established and maintained. The fluid passageway 146 inside the tube defines, in part, the second fluid inlet means. The fluid passageway 148 outside the tube defines, in part, the fluid return means of the present invention. An end plug 150 closes the inner end of bore 132. As best seen in FIG. 4, a radially directed port 152 opens to the fluid passageway 146 inside the tube. One or more radially directed ports 156 provided in arm 22 extend from the axial bore 132 and communicate with the clutch chamber 48 through radially directed holes 158 and 160 provided in the sleeve portion 64 of the hub assembly 56 and member 60, respectively. As such, fluid is directed through the second fluid inlet means to lubricate and wet the clutch assembly 96 and bearing sets 74 and 76. A metered orifice 162 may also be provided in the sleeve portion 64 of the hub assembly 56 for delivering lubricant to the bearing set 74. In addition to fluid which defines means for automatically withdrawing fluid from the clutch chamber when the driving member is rotated. The pitot tube 164 fluidically communicates with the fluid passageway 148 through a radially directed aperture 166 and radially extends into the fluid return chamber 50 in housing 40. The pitot tube and fluid passageway 148 ultimately open to a discharge port 168. The discharge port 168 may empty to a fluid reservoir 172 through a conduit 170. As input drive member assembly 39 is rotated, fluid delivered to the clutch chamber 48 centrifugally forms an annular ring of rotating fluid which is communicated to the fluid return chamber 50 by way of fluid passageways 54. The circulating fluid from the clutch chamber 48 impinges on the open end of the pitot tube 164 and is automatically returned through the tube 164, radial port or aperture 166 and passageway 148 to exhaust port 168 from whence it flows to the lubricant reservoir. As the circulating fluid impinges on the open end of tube 164, pressure may be created to force the lubricant through the fluid return means. A metered orifice 174, having one end opening to the passageway 148 and the other end opening to a location adjacent the bearing set 72 is provided in the cantilevered arm 22. Some of the pressurized fluid flowing from the pitot tube is directed through this metered orifice 174 so as to lubricate the bearing set 72.

When installed, the mounting bracket 18 of the drive unit 10 is fastened to the engine or other suitable nonrotating element. Power is imparted to the unit 10 by the force transfer means 16. That is, the belt or force transfer means 16 rotates the drive member assembly 39 which is rotatably mounted by axially spaced bearings on the cantilevered arm 22. Rotary motion may be transmitted from drive member 39 to the fan hub assembly 56 by the clutch assembly 96. The ratio of input drive speed to output drive speed is determined by the axial compressive force imparted against the clutch assembly 96 by the piston 104. Of course, the degree of axial compressive force is determined by the amount of fluid pressure in the expansible chamber 108. That is, hydraulic pressure, introduced at port 18 from the valve assembly 120, is supplied to the expandable chamber 108 across the rotating joint 124.

One feature of the fan drive assembly is that substantially no axial thrust load is imparted to the spaced bearings during clutch operation. That is, since the piston 104 and expandable chamber 108 are formed as part of the drive input member assembly 39, all clutch clamping forces are confined to the housing 40. As such, substantially no axial thrust load is transferred to the bearings. Additionally, since fluid pressure is transferred across a rotating joint, no additional bearings are required to isolate parts with relative rotation.

Lubricating oil for the clutch pack 96 is supplied to the clutch chamber through the second fluid inlet means connected to inlet port 152. Some of the lubricant is entrained in the bearings 76 and some flows to the other bearing set 74 through the metered orifice 162. The lubricant flow continues into the spline hub 60 through holes 158 and 60 for distribution to the clutch pack 96. After passing through the clutch pack, the lubricant passes through passageways 54 to the return chamber 50 in housing 40. The pressure generated by the lubricant impacting on the open end of the pitot tubes 164 causes the oil to flow to the outlet passage and ultimately to the discharge port 168 from whence it is returned to the oil reservoir 172.

Referring again to FIG. 4 where the element numbers used coincide with those used on FIGS. 1–3 for similar elements of the speed sensor, the cantilevered arm 22 includes a bored hole 291 adapted for insertion of the modular speed sensor 200.

The insertion and use of the speed sensor in connection with the variable speed fan drive conforms to the description above with respect to FIG. 3 where the shaft 270 is represented in the variable speed fan drive 10 by the cantilevered arm 22 and the rotating body 290 is represented by the fan hub assembly 56. The magnet 295 is installed in the fan hub assembly 56. All other components are preferably as described above with respect to the variable speed fan drive 10 and with respect to the modular speed sensor 200.

As can be appreciated from FIG. 4, an embodiment of the present invention allows the modular speed sensor 200 to be quickly and easily removed from the cantilevered arm 22 and replaced. Thus, if the modular speed sensor 200 fails or otherwise needs to be replaced, it is not necessary to replace the entire variable speed fan drive 10. Instead, the variable speed fan drive can be removed from the engine 12, the bolt or other fastener 265 extending though the hole 270 in the tab 260 is removed and then the replaceable speed sensor 200 can be withdrawn from the cantilevered arm 22. A new replaceable speed sensor 200 can then be installed and secured. In this manner, the present invention provides a variable speed fan drive 10 having a speed sensor that is both reliable and serviceable.

Thus, there has been provided a modular speed sensor 200 which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

We claim:

1. An apparatus for sensing the rotational speed of a body, comprising in combination:

a sensor housing, said sensor housing including a sensor housing body having a first and second opening, and an elongate tube having a first and second end, the second end inserted within said second opening of said sensor housing body;

a hall effect sensor installed in said housing, said hall effect sensor being mounted in the first end of said elongate tube;

a first set of electrical connectors electrically connected to said hall effect sensor and extending through a first opening in said sensor housing;

a plug installed in the first end of said elongate tube;

a wire interconnect board installed in said sensor housing body and electrically connected to said first set of electrical connectors, wherein said wire interconnect board includes electrical runs electrically connecting pairs of said first and second set of electrical connectors;

a second set of electrical connectors electrically connected to said wire interconnect board and extending through said first opening of said sensor housing body;

a compression grommet installed in said first opening of said sensor housing body and adjacent to said wire interconnect board, said compression grommet including a hole drilled therethrough; and a compression ring installed in said first opening of said sensor housing body and around a circumference of said compression grommet, said compression ring exerting a holding force to hold said compression grommet in said first opening of said sensor housing body.

2. An apparatus according to claim 1, including:

a tab attached to said sensor housing body, said tab including a bored hole for accepting a fastener;

wherein said sensor housing body includes a channel around a circumference of an exterior surface of said housing body; and an O-ring installed in said sensor housing body channel.

3. An apparatus including a rotating body, a shaft around which the rotating body rotates, and a speed sensor for sensing the speed of the rotating body, comprising in combination:

a shaft having a bored hole;

a rotatable body rotatably mounted on said shaft;

a magnet attached to said rotatable body in a position adjacent to said shaft;

a sensor housing body having a first and second opening and a diameter;

an elongate tube having a first and second end and a diameter, said second end installed in said second opening of said sensor housing body, wherein the diameter of said elongate tube is less than the diameter of said sensor housing body;

a hall effect sensor inserted in said first end of said elongate tube, said hall effect sensor oriented within said elongate tube to sense through a side of said tube, said first end being sealed;

a first set of electrical connectors electrically connected to said hall effect sensor;

a compression grommet installed in said first opening of said sensor housing body, said compression grommet having a hole bored therethrough, wherein said first set of electrical connectors extends through said hole in said compression grommet;

a tab connected to said sensor housing body, said tab having a bored hole for accepting a fastener; wherein said combination of said sensor housing body, said elongate tube, said hall effect sensor, said first set of electrical connectors and said compression grommet are installed within said bored hole of said shaft and said combination is fixed in relation to said shaft with a fastener through said hole is said tab.

4. The apparatus according to claim 3, wherein said bored hole in said shaft is substantially parallel to an axis of rotation of said rotating body.

5. The apparatus according to claim 4, wherein said magnet and said elongate tubing are placed so that the magnet passes adjacent to the hall effect sensor upon each revolution of the rotating body.

6. The apparatus according to claim 5, including:

a wire interconnect board having first connections on a first side of said board and second connections on a second side of said board, said wire interconnect board including electrical runs connecting said first and second connections;

a second set of electrical connectors electrically connected to said second connections;

wherein said first set of electrical connectors are electrically connected to said first connections; and wherein said wire interconnect board is installed in said first opening of said sensor housing body and held in place by said compression grommet.

7. A fan drive assembly having a fan speed sensor, comprising:

a nonrotatable mounting member having a cantilevered shaft portion, said cantilevered shaft portion having a hole bored therein;

relatively rotatable driving and driven members rotatably and coaxially arranged on said shaft portion by axially spaced bearings, with said driving member being provided with a fluid receiving chamber;

a wet clutch assembly disposed intermediate to said driving and driven members, said clutch assembly including at least two friction elements operatively connected to said respective members and adapted to be axially compressed to relatively couple said members, with said coupling varying as to relative rotational slip of said members in accordance with the force of axial compression thereon; and a fluidically actuatable member cooperatively arranged in said chamber for applying a force of axial compression on said friction elements to compress same as a function of the amount of fluid pressure introduced into said chamber, said actuatable member and said chamber being arranged such that substantially no axial thrust load is applied to said bearings when a force of axial compression is applied to said friction elements;

said driving and driven members being provided with complementary means for preventing cord debris from becoming entangled thereabout;

a magnet installed on said driven member; and a speed sensor installed in said hole of said cantilevered support member, wherein said speed sensor includes:

a sensor housing, said sensor housing including a sensor housing body having a first and second opening, and an elongate tube having a first and second end, the second end inserted within said second opening of said sensor housing body;

a hall effect sensor installed in said housing, said hall effect sensor being mounted in the first end of said elongate tube;

a first set of electrical connectors electrically connected to said hall effect sensor and extending through a first opening in said sensor housing;

a plug installed in the first end of said elongate tube;

a wire interconnect board installed in said sensor housing body and electrically connected to said first set of electrical connectors, wherein said wire interconnect board includes electrical runs electrically connecting pairs of said first and second set of electrical connectors;

a second set of electrical connectors electrically connected to said wire interconnect board and extending through said first opening of said sensor housing body;

a compression grommet installed in said first opening of said sensor housing body and adjacent to said wire interconnect board, said compression grommet including a hole drilled therethrough; and a compression ring installed in said first opening of said sensor housing body and around a circumference of said compression grommet, said compression ring exerting a holding force to hold said compression grommet in said first opening of said sensor housing body.

8. The apparatus according to claim 7, wherein said speed sensor includes:

a tab attached to said sensor housing body, said tab including a bored hole for accepting a fastener;

wherein said sensor housing body includes a channel around a circumference of an exterior surface of said housing body; and an O-ring installed in said sensor housing body channel.

* * * * *